US012745712B2

(12) United States Patent
Blancke et al.

(10) Patent No.: US 12,745,712 B2
(45) Date of Patent: Sep. 29, 2026

(54) HEADER

(71) Applicant: CNH Industrial Belgium N.V., Zedelgem (BE)

(72) Inventors: Jeffrey Blancke, Markegem (BE); Simon Beelaert, Adegem (BE); Frederik Demon, Sint-Kruis (BE); Stijn Van Belleghem, Maldegem (BE)

(73) Assignee: CNH Industrial Belgium N.V. (BE)

( * ) Notice: Subject to any disclaimer, the term of this patent is extended or adjusted under 35 U.S.C. 154(b) by 374 days.

(21) Appl. No.: 18/539,788

(22) Filed: Dec. 14, 2023

(65) Prior Publication Data

US 2024/0196798 A1 Jun. 20, 2024

(30) Foreign Application Priority Data

Dec. 15, 2022 (EP) .................................... 22213824

(51) Int. Cl.
*A01D 89/00* (2006.01)

(52) U.S. Cl.
CPC ......... *A01D 89/001* (2013.01); *A01D 89/006* (2013.01)

(58) Field of Classification Search
CPC .. A01D 89/001; A01D 89/006; A01D 89/008; A01D 89/00; A01D 47/00; A01D 51/00; A01F 15/10
See application file for complete search history.

(56) References Cited

U.S. PATENT DOCUMENTS

| | | | | |
|---|---|---|---|---|
| 4,171,606 | A | 10/1979 | Ziegler et al. | |
| 5,916,116 | A | 6/1999 | Vande Ryse et al. | |
| 2020/0041340 | A1 * | 2/2020 | Schade | G01J 3/0232 |
| 2020/0084965 | A1 | 3/2020 | Neitemeier et al. | |

(Continued)

FOREIGN PATENT DOCUMENTS

| | | | | |
|---|---|---|---|---|
| CN | 113647242 | A * | 11/2021 | A01D 47/00 |
| CN | 115250750 | A * | 11/2022 | A01D 51/00 |
| DE | 102019207984 | A1 | 12/2020 | |

(Continued)

OTHER PUBLICATIONS

English translation of Wen et al. (CN 113647242) (Year: 2021).*

(Continued)

*Primary Examiner* — Kyle J Kingsland
(74) *Attorney, Agent, or Firm* — Buchanan Ingersoll & Rooney PC

(57) ABSTRACT

An agricultural harvester includes a header with a pickup mechanism for picking up crop from a field and a feeder for feeding the crop into the agricultural harvester for further processing. The feeder is pivotably connected to a chassis of the agricultural harvester via at least one lift cylinder. The header is connected to the feeder for pivoting therewith and includes a pickup mechanism supported by a frame. The header further includes at least one wheel for supporting the frame on the ground. A sensor is configured to detect a ground surface composition in an area behind the pickup mechanism, while a control system is operably coupled to the at least one lift cylinder and the sensor, and configured to operate the at least one lift cylinder to adjust a pressure that the header exerts on the ground in dependence of the detected ground surface composition.

16 Claims, 5 Drawing Sheets

(56) References Cited

U.S. PATENT DOCUMENTS

| | | | | |
|---|---|---|---|---|
| 2023/0189711 | A1* | 6/2023 | Mcdonald | G06T 7/73<br>56/10.2 A |
| 2023/0320274 | A1* | 10/2023 | Vandike | G06V 20/56<br>701/50 |

FOREIGN PATENT DOCUMENTS

| | | | | |
|---|---|---|---|---|
| EP | 1611781 | A1 | 1/2006 | |
| EP | 2508057 | A1 | 10/2012 | |
| EP | 2545761 | A1 | 1/2013 | |
| EP | 3871481 | A1 | 9/2021 | |
| EP | 3912456 | A1 * | 11/2021 | A01D 89/008 |

OTHER PUBLICATIONS

English translation of Li et al. (CN 115250750) (Year: 2022).*

Extended European Search Report for European Application No. 22213824.0, dated May 26, 2023, 5 pages.

* cited by examiner

HEADER

CROSS REFERENCE TO RELATED APPLICATION

This application claims priority to European Application No. 22213824.0, filed Dec. 15, 2022, the content of such application being incorporated by reference herein in its entirety.

FIELD OF THE INVENTION

The present invention relates to a header such as a pickup assembly for an agricultural harvester such as a forage harvester.

BACKGROUND OF THE INVENTION

Certain agricultural machines, such as forage harvesters, forage wagons, mergers, and balers, collect crop material that has been cut from a field. The component of such agricultural machines which gathers the crop material and feeds it further into the machine for subsequent processing is generally known as a pickup assembly. The subsequent processing may, for example, involve baling, threshing, chopping, storing and/or depositing.

To this end, a pickup assembly is usually provided with a pickup unit, a guiding element and a feeding auger. The pickup unit is typically in the form of a pickup drum rotatably mounted on the pickup assembly frame. The pickup drum has radially arranged projecting tines to collect the crop material and propel it upwards, past the guiding element, and then into the feeding auger that moves the crop laterally towards a feed channel through which the crop material is conveyed into the machine for subsequent processing. The guiding element is generally referred to as a wind guard, and serves the purposes of restricting the movement of the collected crop material in the forward and upward direction, shielding the crop flow path from wind influence and guiding the crop material efficiently into the feed channel.

The pickup assembly is supported by a frame, which in turn is supported above the ground by way of one or more, typically two or four, wheels. The wheels are provided for engaging the ground as the agricultural machine is driven across the hill. When height adjustable, the wheels are often called gauge wheels and may assist in maintaining the pickup assembly at a suitable height for gathering crop. However, when the machine passes over uneven ground surfaces and/or over ground surface with an otherwise unexpected composition, the wheels and the pickup assembly frame may start bouncing and it can be difficult to keep the pickup assembly at a constant height. The interaction between the gauge wheels and the ground can thus undesirably influence the ability of the pickup assembly to gather crops. In some instances, where the characteristics of the ground are particularly unusual, this can result in an unacceptable quantity of crop being gathered up by the pickup assembly or stones taken in. Furthermore, unexpected vertical movement of the frame may cause the tines of the pickup drum to dig into the ground.

It is an aim of the present invention to address the one or more disadvantages associated with this prior art.

SUMMARY OF THE INVENTION

According to an aspect of the invention there is provided an agricultural harvester comprising a header with a pickup mechanism for picking up crop from a field and a feeder for feeding the crop into the agricultural harvester for further processing. The feeder is pivotably connected to a chassis of the agricultural harvester via at least one lift cylinder. The header is connected to the feeder for pivoting therewith and comprises a pickup mechanism supported by a frame. The header further comprises at least one wheel for supporting the frame on the ground. A sensor is configured to detect a ground surface composition in an area behind the pickup mechanism, while a control system is operably coupled to the at least one lift cylinder and the sensor, and configured to operate the at least one lift cylinder to adjust a pressure that the header exerts on the ground in dependence of the detected ground surface composition.

It has been observed that when the ground that an agricultural vehicle is passing over is, e.g., too soft or too hard, the header can be ineffective at collecting crop. For example, when the ground is too soft and/or wet (e.g. from rain), the header is observed to sink too much into the ground, whereas when the ground is too hard and/or uneven (e.g. from drought or a stony composition), the header is observed to bounce unsteadily over the ground. In both cases, the ability to pick up crop is affected due to the positioning of the header with respect to the ground. The invention overcomes this by adjusting the pressure applied to the header by the at least one lift cylinder in response to detecting specific ground surface compositions in an area behind the pickup mechanism, thereby steadying the header over the ground surface composition, and thus improving the header's ability to collect crop thereon. Since the sensor is arranged to detect ground rearward of the pickup mechanism, the header can adapt to new terrain as it proceeds.

The term 'ground surface composition' herein refers to characteristics of the ground that the header has just passed over. The ground surface composition may, e.g., relate to the shape of the ground itself—such as, an irregularity in the ground such as tyre tracks defined therein or a field border when driving to close to the edge of the field—or it may relate to the presence of something unexpected on it—for example, an irregular pattern of left-over crop on the ground.

When the detected ground surface composition, e.g., comprises an irregular pattern of left-over crop on the ground, it indicates that the header has passed over a section of crop but has failed to collect it uniformly. This is often because the ground is hard or stony or dry or uneven such that the header bounces along the ground as it passes thereover. When the header bounces unsteadily, this may cause the tines of the pickup drum to be dug into the ground. Accordingly, the header is unable to pick up the crop on the ground uniformly, and an irregular pattern of left-over crop is left behind. The control system is preferably configured to operate the at least one lift cylinder to adjust the pressure that the header exerts on the ground in dependence of the detected irregular pattern of left-over crop on the ground. For example, by decreasing the pressure on the ground, the bouncing of the header on the hard or stony or dry or uneven ground may be reduced, and hence the header collects the crop more effectively, the tines are not dug into the ground and stones are not taken into the header. The need to pass over the same ground again with the header is reduced significantly.

When the detected ground surface composition, e.g., comprises tyre tracks in the ground, these are often caused by the wheel(s) of the header and/or the agricultural vehicle. This typically occurs when the ground is soft or wet. This is because when the ground is soft or wet, the tyres are sunk more into the ground and tracks or impressions thereof are left behind. In these conditions, when the wheels are lower, the header is unable to collect crop at the correct height. For example, the tines of the pickup mechanism may dug into the ground, which can lead to damage to the pickup mechanism and a failure to pick all crop material up from the field. Further, this may lead to sand and other non-crop material to be taken in, thereby contaminating the volume of harvested crop and possibly damaging the machine. The control system is preferably configured to operate the at least one lift cylinder to adjust the pressure that the header exerts on the ground in dependence of detected tyre tracks in the ground. For example, by reducing the downward pressure on the ground, the tyre may sink less into the field, and the header is able to collect crop more effectively.

In an embodiment, the header may further comprise at least one height adjustment actuator, coupled between the at least one wheel and the frame for adjusting a height of the pickup mechanism relative to the ground. Such height adjustment actuators may be manually operable. Alternatively, the height adjustment actuators can be controlled electrically or hydraulically from the driver cabin, preferably while harvesting. By providing an optimal combination of the height of the pickup mechanism and the pressure exerted on the ground by the header in dependence of the detected ground surface composition, a more efficient and effective pickup of the crop from the field can be realised.

The at least one wheel for supporting the frame on the ground may comprise a front wheel and/or a rear wheel. With the rear end of the header being carried by the feeder of the agricultural harvester, the frame of some embodiments of the header according to the invention may be supported by just two front wheels. Larger and heavier headers may further comprise one or more, preferably two, rear wheels for properly supporting the header frame on the ground.

Preferably, the sensor is arranged close to or on the header. The sensor may be arranged on the frame, preferably on the rearward portion thereof. Alternatively, the sensor may be arranged on the feeder or on a chassis part of the agricultural harvester, at a position that offers a good view on the ground surface in the relevant area behind the pickup mechanism.

Preferably, the sensor is a LIDAR sensor, a radar sensor, an ultrasound sensor, or a camera such as an infrared camera or a stereo camera. The sensor can be of any type of camera that is suitable for detecting differences in the ground, crop and/or stubble.

The lift cylinder is preferably a hydraulic cylinder but may also be an adjustable pneumatic cylinder, spring, damper, actuator coupling, or a combination of such elements.

The header may, e.g., be a pickup assembly or a corn header. The agricultural vehicle may be a harvester such as a forage harvester, a combine harvester, a baler, or a merger.

BRIEF DESCRIPTION OF THE DRAWINGS

Embodiments of the invention will now be described by way of example with reference to the accompanying drawings, in which.

DETAILED DESCRIPTION OF THE PREFERRED EMBODIMENTS

In the following, a header is described in which the above-described invention may be advantageously used. The directions up, down, forward, and rearward are herein defined relative to the general orientation and direction of an agricultural harvester and the header driving over a field and collecting crop.

Figure 1:
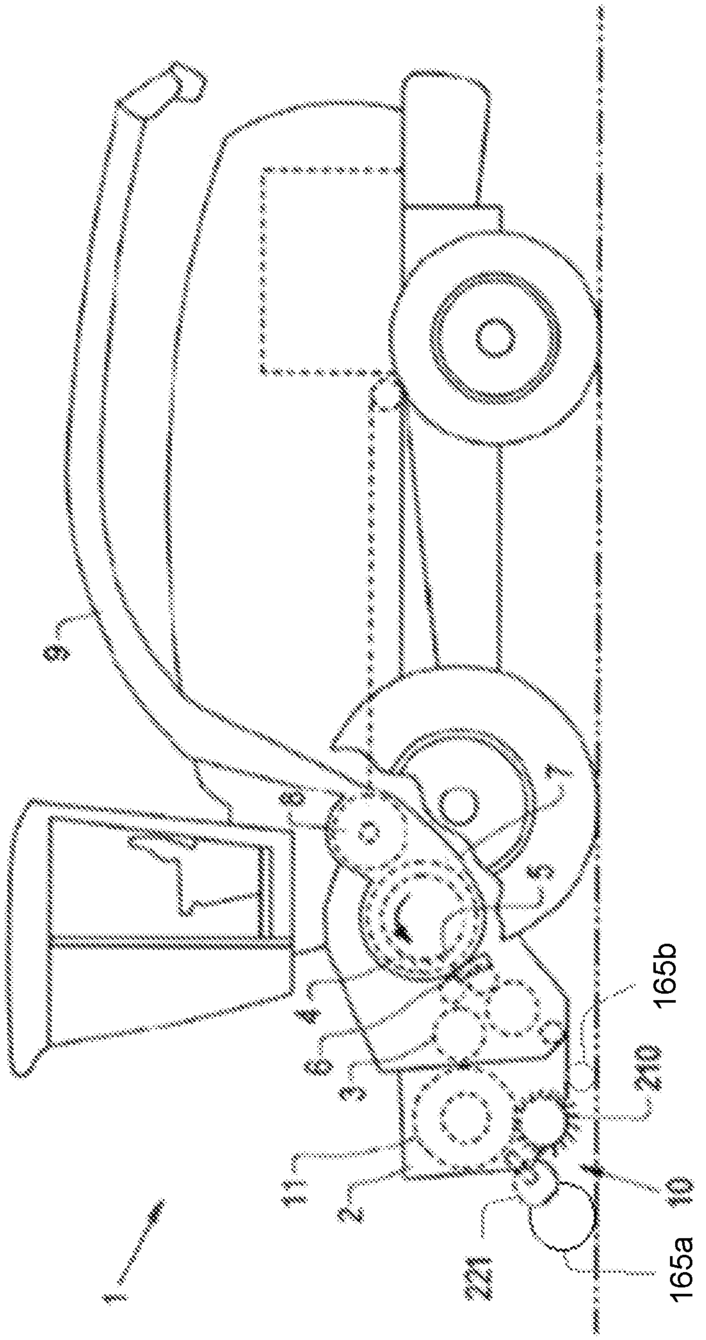
FIGS. 1 and 2 schematically show a forage harvester with a header that may embody one or more of the inventions described herein.
Figure 2:
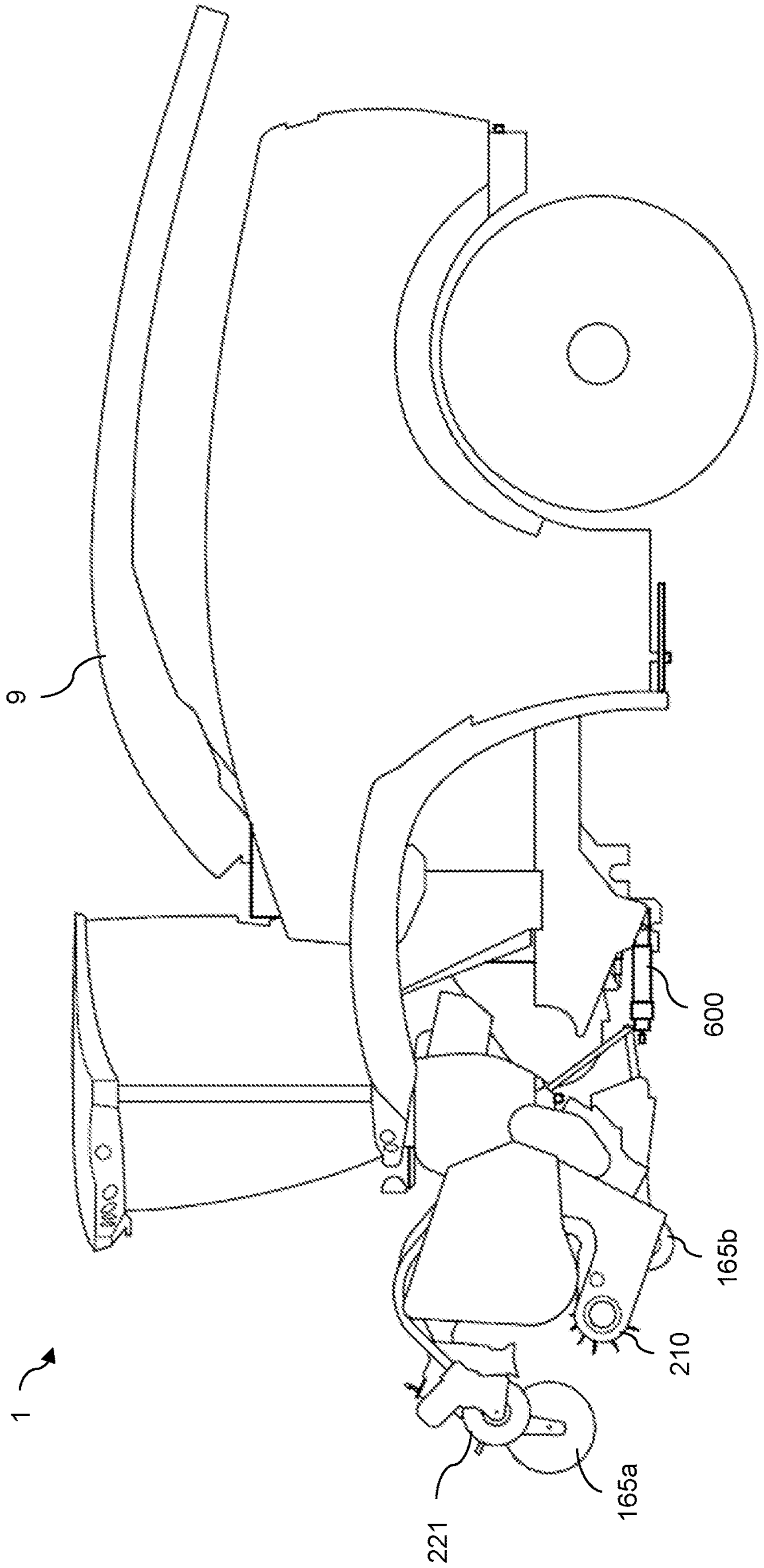

FIGS. 1 and 2 show a schematic side view of an exemplary embodiment of an agricultural harvester, illustrated in the form of a forage harvester 1. As the harvester 1 advances through a field, crops, e.g. grass or alfalfa, are gathered by a header in the form of a pickup assembly 2 and transported to a central crop inlet of the forage harvester 1 where they enter the harvester 1 through a set of feed rolls 3. The feed rolls 3 guide the crops in the form of a mat with a given thickness towards the cutting drum 4, which rotates in the direction indicated by the arrow, about a rotation axle that is transversal to the direction of movement of the crops. Knives 5 are mounted on and distributed along the full circumference of the drum 4, so that the knives 5 pass by a stationary shear bar 6 as the drum 4 rotates, thereby chopping the crops into small pieces which are further transported between the cutting drum 4 and a concave 7. The chopped material is then ejected by a blower 8 through a spout 9. It should be appreciated that while the agricultural vehicle is illustrated and described as a forage harvester 1, in some embodiments the pickup assembly 2 may be used in combination with other agricultural vehicles such as a merger or a baler, e.g., a large square baler, a small square baler, or a round baler.

Figure 3:
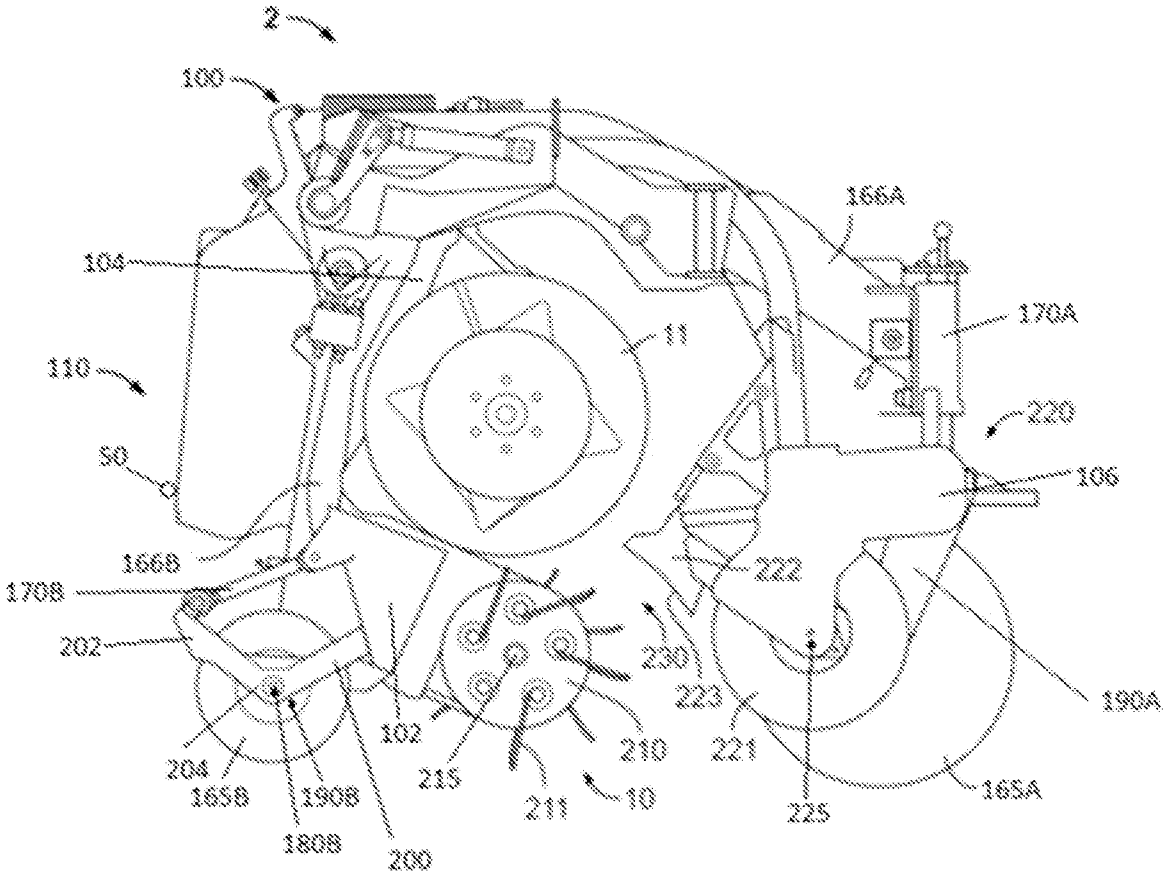
FIG. 3 shows a cross section of the header of FIG. 1 or 2.
Figure 4:
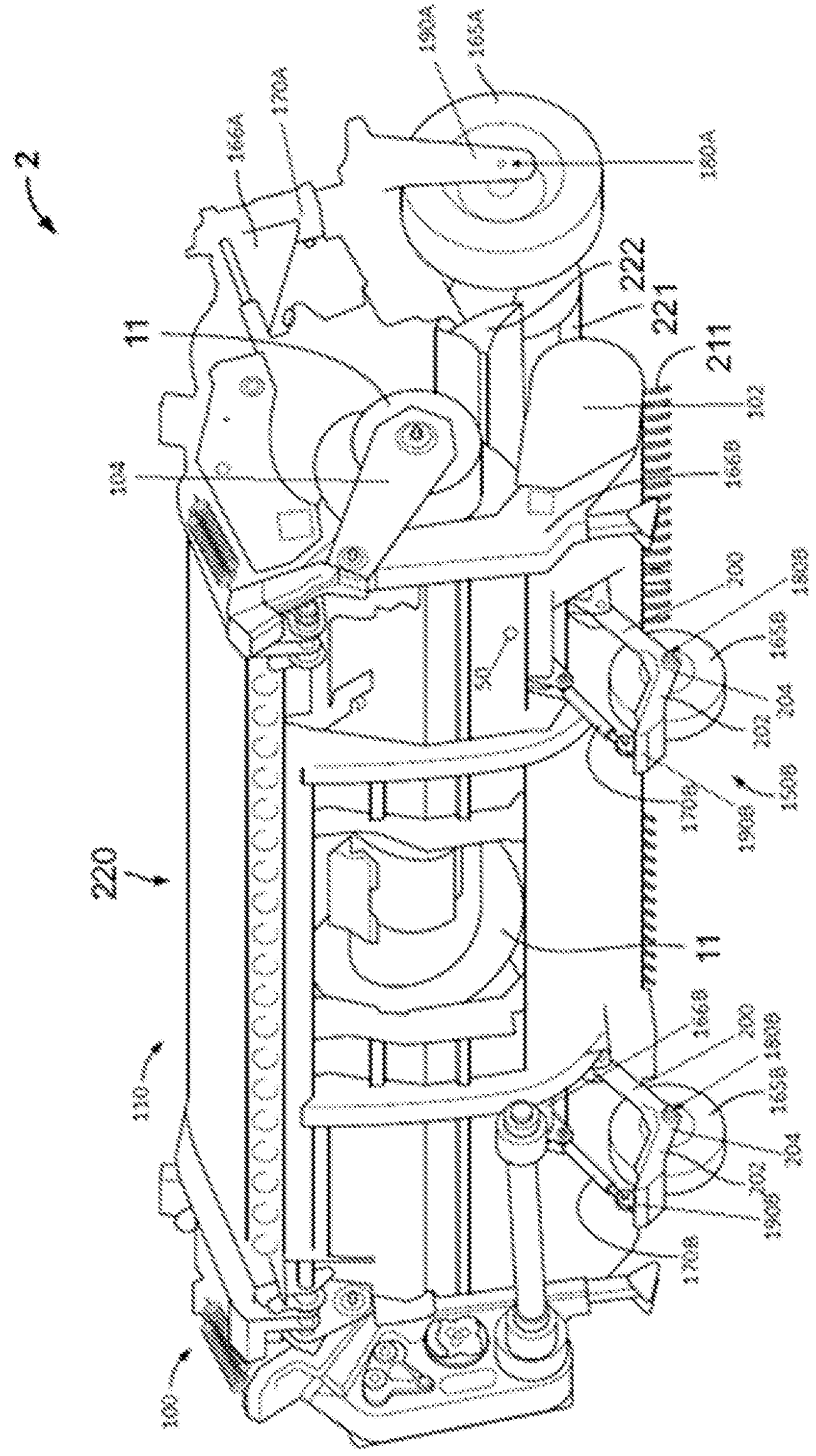
FIG. 4 shows a perspective rear view of the header of FIG. 1 or 2.

FIGS. 3 and 4 show the pickup assembly 2 for the forage harvester 1 in further detail. The pickup assembly 2 is provided with a pickup assembly frame 100 that supports a pickup mechanism 110 which picks up or collects crop from the ground and directs it into an inlet of the harvester 1, as the pickup assembly 2 is driven over the ground by the forage harvester 1. When harvesting, the pickup assembly frame 100 is connected to the feeder of the forage harvester 1. The feeder is pivotably connected to a chassis of the forage harvester 1 via one or more adjustable lift cylinders 600.

To support the frame 100—and hence the pickup mechanism 110—at the right height above the ground for collecting crop from the ground, the pickup assembly 2 is provided with at least one wheel 165A, 165B. The or each wheel 165A, 165B is provided for supporting the frame 100 on the ground. The possibility to adjust the one or more lift cylinders 600 allows the frame 100 of the pickup assembly 2 to exert varying degrees of pressure (or suspension) on the wheels 165A, 165B and hence the ground. The at least one lift cylinder 600 is preferably realised in the form of a hydraulic cylinder, but may also take the form of, e.g., an adjustable pneumatic cylinder, spring, damper, actuator coupling, or any suitable combination of such elements.

The pickup assembly 2 is further provided with a sensor 50 configured to detect a ground surface composition in an area behind the pickup mechanism 110. The term 'ground surface composition' herein refers to characteristics of the ground that the pickup assembly 2 has just passed over. The ground surface composition may, e.g., relate to the shape or configuration of the ground itself—for example, tyre tracks or drought cracks defined in the ground. Likewise, the ground surface composition may relate to the presence of something unexpected on it—for example, an irregular pattern of left-over crop on the ground or to a distribution of pebbles or rocks on the ground. To this end, the sensor 50 is preferably arranged on the pickup assembly, and the sensor 50 takes an image of the area behind the pickup mechanism 110 and recognises the ground surface composition based on an analysis of the taken image.

The pickup assembly 2 further comprises a control system 500 operably coupled to the or each lift cylinder 600 and the sensor 50. The control system 500 is configured to operate or control the or each controllable lift cylinder 600 to adjust, i.e., increase or decrease, the pressure that the frame 100 of the pickup assembly 2 exerts on the ground in dependence of a ground surface composition detected by the sensor 50. In this way, as will now be explained, the control system 500 can ensure that the pickup assembly 2 collects crop more effectively when passing over different types of ground.

In more detail, this invention has been conceived out of the inventors' discovery that the type of ground that a harvester 1 is passing over can have an undesirable impact on the pickup assembly's ability to collect crop. When the harvester 1 is passing over ground that is too soft and/or wet (e.g. because it has recently rained), the pickup assembly 2 sinks too much into the ground, and the pickup assembly 2 is arranged too low with respect to the crop. Consequently, the tines 211 of the pickup unit 10 may dug into the ground, which can lead to damage to the pickup unit 10 and a failure to pick all crop material up from the field. Further, this may lead to sand and other non-crop material to be taken in, thereby contaminating the volume of harvested crop and possibly damaging the machine. When the harvester 1 is passing over ground that is too hard and/or uneven (e.g. from drought or a stony composition of the ground), the pickup assembly 2 has been observed to sometimes bounce along the ground, thereby compromising the ability of the pickup assembly 2 to pick up the crop uniformly. When the header bounces unsteadily, this can also cause the tines of the pickup drum to be dug into the ground. Also, when the pickup assembly 2 collects the crop irregularly, it may sometimes be necessary to pass the harvester 1 back over the same area of ground in order to collect the crop that was not gathered during the first pass over.

By adjusting the pressure on the wheels 165A, 165B in dependence of the detected ground surface composition, the invention is able to avoid the aforementioned unwanted and undesirable consequences associated with the ground surface composition. For example, when the ground is soft and/or wet, it is advantageous to reduce the downward pressure of the frame 100 on the ground. This is because such a reduction in downward pressure causes the wheels 165 to be sunk less into the ground, and the frame 100—and hence the pickup mechanism 110—can be maintained at the right height above the ground for collecting crop effectively. Meanwhile, when the ground is hard and/or uneven, it is advantageous also to reduce the downward pressure of the frame 100 on the ground. This is because such a reduction in downward pressure reduces the intake of stones on the hard or stony or uneven ground, and so the pickup assembly 2 can gather up crop more uniformly and the tines do not dig into the ground. For ground that is neither too soft/wet nor too hard/uneven—i.e. for ground with "normal" or average hardness and flatness—it may be advantageous to increase the downward pressure of the frame 100 on the ground since it increases grip and allows for a smoother intake of crop at higher speeds for the pickup assembly 2. In sloping fields it can be advantageous to increase the pressure too, because the increased pressure may improve the ground following behaviour of the pick-up mechanism.

In this way, suspension control of the header frame 100 can be used to ensure the pickup assembly 2 effectively collects crop over changes in the ground of a field.

More details about the pickup assembly 2 will now be provided. Firstly, the pickup mechanism 110 will be described in more detail.

As shown in FIGS. 3 and 4, the pickup mechanism 110 is made up of a pickup unit 10, a crop material conveyor in the form of a feeding auger 11, and a wind guard assembly or guiding element 220.

The pickup unit 10 is configured to pick up crop from the ground and includes a pickup drum 210 that carries a plurality of tines 211 to this end. The unit 10 comprises a pickup unit frame 102 and a pickup drum 210 that is rotatably mounted on the pickup unit frame 102. To this end, the pickup unit frame 102 is provided with a pickup axle 215 that extends transversely to the direction of movement of the harvester 1, and the pickup drum 210 is configured to rotate about the pickup axle 215. The tines 211 of the pickup unit 10 are radially arranged projecting tines 211. As the pickup drum 210 rotates, the rotating tines 211 pick crop material up from the ground and move it towards the feeding auger 11. The feeding auger 11, which is supported by a feeding auger frame 104 above the pickup drum 210, then conveys the picked up crop material towards an inlet of the harvester 1—or to a central location where a separate conveyor conveys the crop material toward the interior of the harvester 1—for subsequent processing.

The pickup assembly 2 also includes the wind guard assembly 220 for restricting the movement of the crop picked up by the pickup unit 10 in the forward and upward direction, shielding the crop flow path from wind influence and guiding the crop material efficiently towards the feeding auger 11 and into the inlet of the harvester 1. To this end, the wind guard assembly 220 is provided with a wind guard frame 106 and a cylindrical roller 221 rotatably mounted on the wind guard frame 106. To this end, the wind guard frame 106 is provided with a roller axle 225 that extends transversely to the direction of movement of the harvester 1, and the cylindrical roller 221 is configured to rotate about the roller axle 225 during operation. It should be appreciated that while the roller 221 is illustrated and described as a cylindrical roller 221, the roller 221 can be formed to have other shapes. The roller 221 may be a fixed roller, i.e., a roller that generally maintains a fixed position of the roller axis 225 during operation, or an adjustable roller, i.e., a roller that can be appreciably re-positioned so the roller axis 225 moves to accommodate for variations swath height. The wind guard roller 221 is followed by guidance plate 222 thereabove.

In this way, an infeed channel 230 for crop is formed between the wind guard roller 221 and an infeed channel surface 223 of the guidance plate 222 on one side and the pickup drum 210 with its tines 211 on the other side.

Now that the pickup mechanism 110 has been described, more details about the pickup assembly frame 100 will be provided.

The pickup assembly frame 100 supports all components of the pickup mechanism 110 and other functional parts of the pickup assembly 2. The pickup assembly frame 100 comprises a forward portion 166A located towards the foremost side of the pickup assembly 2, and a rearward portion 166B located towards the rearmost side of the pickup assembly 2. The pickup unit frame 102 that supports the pickup unit 10 and the feeding auger frame 104 that supports the feeding auger 11 are both mounted on the rearward portion 166B of the pickup assembly frame 100. Meanwhile, the wind guard frame 106 that supports the wind guard assembly 220 is pivotably coupled to the forward portion 166A of the pickup assembly frame 100. This allows the wind guard assembly 220 to be pivoted away from the other components of the pickup mechanism 110. In other embodiments, the wind guard assembly 220 is mounted on the forward portion 166A of the pickup assembly frame 100.

The frame 100 may include a coupling mechanism (not shown) for releasably mounting the pickup assembly 2 to the harvester 1 when needed, or else it may be fixedly attached to the feeder of the harvester 1.

As best appreciated from FIG. 3, the pickup assembly 2 is provided with two front wheels 165A for supporting the forward portion 166A of the frame 100 on the ground. The front wheels 165A are arranged at the fore of the wind guard assembly 220, and at respective lateral ends of the wind guard assembly 220, at the extremities thereof. Each front wheel 165A is rotatably arranged on a front wheel axle 180A that extends transversely to the direction of movement of the harvester 1. Each front wheel axle 180A is supported by a front wheel support 190A.

A front height adjustment actuator 170A may be coupled between each front wheel 165A and the frame 100 for adjusting a height of the pickup mechanism 110 relative to the ground. Such height adjustment actuators 170A may be manually operable. Alternatively, the height adjustment actuators 170A can be controlled electrically or hydraulically from the driver cabin, preferably while harvesting. By providing an optimal combination of the height of the pickup mechanism 110 and the pressure exerted on the ground by the header 2 in dependence of the detected ground surface composition, a more efficient and effective pickup of the crop from the field can be realised.

Likewise, the pickup assembly 2 of this embodiment is provided with two rear wheels 165B for supporting the rearward portion 166B of the frame 100 on the ground. The rear wheels 165B are arranged at the rear of the pickup unit 10, and at respective lateral ends of the pickup unit 10, between the extremities thereof. Each rear wheel 165B is rotatably arranged on a rear wheel axle 180B that extends transversely to the direction of movement of the harvester 1. Each rear wheel axle 180B is supported by a rear wheel support 190B.

Each rear wheel support 190B comprises a pair of wheel arms in the form of a fore wheel arm 200 and a rear wheel arm 202. Each rear wheel support 190B is directly attached to the rearward portion 166B of the pickup assembly frame 100 at an end of the fore wheel arm 200 opposite the bend 204 and to a rear height adjustment actuator 170B at an end of the rear wheel arm 202 opposite the bend 204. Each rear height adjustment actuator 170B is also attached to the rearward portion 166B of the pickup assembly frame 100 at a position spaced away from the connection of the fore wheel arm 200 to the rearward portion 166B. Preferably, all of these attachments are pivotable. Each rear wheel axle 180B is mounted on the rear wheel support 190B proximate to the bend 204. The rear height adjustment actuators 170B are thus arranged between the rearward portion 166B of the frame 100—which supports the pickup unit 10—and the rear wheels 165B. In this way, each rear height adjustment actuator 170B can control the height of the rearward portion 166B of the pickup assembly 2 relative to the ground.

Now more details about the sensor 50 will be provided.

As stated above, the sensor 50 is configured to detect a ground surface composition in an area behind the pickup mechanism 110. In this way, the sensor 50 can ascertain whether the ground that the harvester is passing over is different to the ground before. When such a ground surface composition is detected, the sensor 50 outputs a sensor output to the control system 500 which controls the pressure that the frame 100 exerts on the ground in dependence of the output signal. Since the sensor 50 is arranged to detect the ground rearward of the pickup assembly 2, the pickup assembly 2 can adapt to a changing ground surface as it is driven along. To detect the ground rearward of the pickup assembly 2, the sensor is preferably mounted on the rearward portion 166B of the frame 100 and is preferably arranged to face away from the pickup assembly 2 and down towards the ground.

The sensor 50 is preferably configured to detect tyre tracks or impressions in the ground, e.g. that have been left from the wheels 165 passing thereover. Such tracks are left when the ground is soft, and in particular when the ground is soft and wet. In other embodiments, the sensor 50 may be configured to detect crop left behind.

The sensor 50 is also preferably configured to detect an irregular pattern of left-over crop on the ground. This is because such an irregular pattern indicates that the pickup assembly 2 has passed over the crop but has failed to collect it uniformly. This often occurs when the ground is hard or uneven, and the pickup assembly 2 is caused to bounce along the ground as it passes thereover. In other embodiments, the sensor 50 may be configured to detect stones or pebbles in the ground, drought cracks in the ground To this end, the sensor 50 may be any type of sensor that is capable of detecting the above-stated differences in ground, crop and stubble about the pickup assembly 2. To this end, the sensor 50 may be a LIDAR sensor, a radar sensor, an ultrasound sensor, or a camera such as an infrared camera or a stereo camera.

Preferably, the sensor 50 is arranged close to or on the header 2. The sensor 50 may be arranged on the frame 100, preferably on the rearward portion 166B thereof. Alternatively, the sensor 50 may be arranged on the feeder or on a chassis part of the agricultural harvester 1, at a position that offers a good view on the ground surface in the relevant area behind the pickup mechanism 110.

Finally, more information about the control system 500 will be provided.

Figure 5:
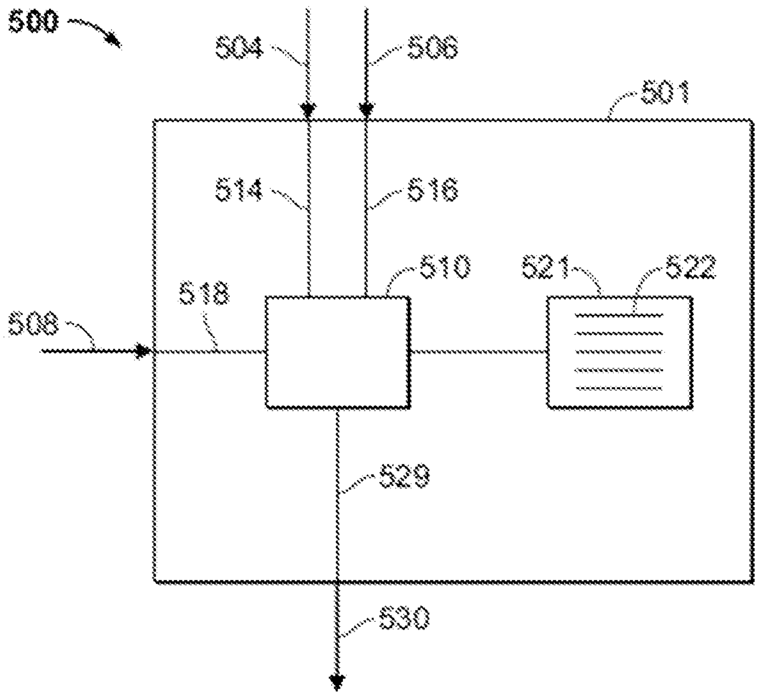
FIG. 5 shows a schematic representation of a control system for controlling the header of FIG. 1 or 2.

The control system 500 controls the pressure that the frame exerts on the ground in dependence of the output signal from the sensor 50. The control system 500 is shown in FIG. 5.

The control system 500 may comprise one or more controllers 501 configured to receive an input signal 504 indicative of a ground surface composition in an area behind the pickup mechanism. The input signal 504 may be provided, for example, by the sensor output of the sensor 50 described above. The input signal 504 may be used to determine a desired pressure in the at least one lift cylinder 600 in dependence of the ground surface composition. The control system 500 may then issue a control signal 530 to control the at least one lift cylinder 600 to adjust if needed, i.e., increase or decrease, the pressure that the frame 100 exerts on the ground.

The control system 500 may be configured to receive one or more further input signals 506, 508 indicative of, for example, a mode of operation of the pickup assembly 2, or a current pressure in the at least one lift cylinder 600.

The or each controller 501 comprises at least one electronic processor 510 having one or more electrical input(s) 514, 516, 518 for receiving one or more of input signals 504, 506, 508, and one or more electrical output(s) 529 for outputting one or more output signals 530 for receipt by the tensioning elements 170. The or each controller 501 further comprises at least one memory device 521 electrically coupled to the at least one electronic processor 510 and having instructions 522 stored therein. The at least one electronic processor 510 is configured to access the at least one memory device 521 and execute the instructions 522 thereon so as to determine the desired pressure in the at least one lift cylinder 600.

Variations on the pickup assembly 2 described above will also be apparent to the skilled person. For example, a header that can cut crop as well as collect it may be used in place of the pickup assembly 2 described above. Additionally or alternatively, the header may be a corn header. When the header is a corn header, the invention may advantageously ensure a constant stubble height. To this end, the detected ground surface composition may be a high or low stubble height, and the control system 500 may be configured to operate the at least one lift cylinder 600 to adjust the pressure that the frame 100 exerts on the ground in dependence of the detected stubble height.

REFERENCE NUMERALS

1 Agricultural harvester/forage harvester
2 Header/pickup assembly
3 Feed rolls
4 Cutting drum
5 Knives
6 Shear bar
7 Concave
8 Blower
9 Spout
10 Pickup unit
11 Feeding auger
50 Sensor
100 Pickup assembly frame
102 Pickup unit frame
104 Feeding auger frame
106 Wind guard frame
110 Pickup mechanism
165A Front wheel
165B Rear wheel
166A Forward portion
166B Rearward portion
170A Front height adjustment actuator
170B Rear height adjustment actuator
180A Front wheel axle
180B Rear wheel axle
190A Front wheel support
190B Rear wheel support
200 Fore wheel arm
202 Rear wheel arm
204 Bend
210 Pickup drum
211 Tines
215 Pickup axle
220 Wind guard assembly
221 Cylindrical roller
222 Guidance plate
223 Channel surface
225 Roller axle
230 Infeed channel
500 Control system
501 Controller(s)
504 Input signal
506 Input signal
508 Input signal
510 Electronic processor(s)
514 Electrical input
516 Electrical input
518 Electrical input
521 Memory device(s)
522 Instructions
529 Electrical output(s)
530 Control signal(s)
600 Lift cylinder(s)

What is claimed is:

1. An agricultural harvester comprising:

a header including a pickup mechanism that picks up crop from a field, a frame that supports the pickup mechanism, and the pickup mechanism including at least one wheel that supports the frame on the ground;

a feeder feeding the crop into the agricultural harvester for further processing, the feeder being pivotably connected to a chassis of the agricultural harvester via at least one lift cylinder, the header being connected to the feeder that pivots therewith;

a sensor detecting a ground surface composition in an area behind the pickup mechanism; and a control system operably coupled to the at least one lift cylinder and the sensor, wherein the control system operates the at least one lift cylinder in adjusting a pressure that the header exerts on the ground based on the detected ground surface composition;

wherein the at least one wheel that supports the frame on the ground comprises a pair of front wheels supporting a forward portion of the frame; and wherein the pair of front wheels are arranged at a fore of a wind guard assembly and at respective lateral ends of the wind guard assembly of the pickup mechanism.

2. The agricultural harvester of claim 1, wherein the ground surface composition comprises an irregular pattern of left-over crop on the ground; and wherein the control system operates the at least one lift cylinder in adjusting the pressure that the header exerts on the ground based on the irregular pattern of left-over crop on the ground.

3. The agricultural harvester of claim 1, wherein the ground surface composition comprises an irregularity in the ground, including tire tracks or a border; and wherein the control system operates the at least one lift cylinder in adjusting the pressure that the header exerts on the ground based on the irregularity.

4. The agricultural harvester of claim 1, wherein the header further comprises at least one height adjustment actuator coupled between the at least one wheel and the frame in adjusting a height of the pickup mechanism relative to the ground.

5. The agricultural harvester of claim 1, wherein the at least one wheel that supports the frame on the ground comprises a front wheel and/or a rear wheel.

6. The agricultural harvester of claim 1, wherein the sensor comprises a LIDAR sensor, a radar sensor, an ultrasound sensor, or a camera.

7. The agricultural harvester of claim 6, wherein the camera comprises an infrared camera or a stereo camera.

8. The agricultural harvester of claim 1, wherein the sensor is provided on the header.

9. The agricultural harvester of claim 1, wherein the agricultural harvester comprises a forage harvester, a combine harvester, a baler, or a merger.

10. The agricultural harvester of claim 1, wherein the at least one wheel that supports the frame on the ground further comprises a a pair of rear wheels supporting a rearward portion of the frame on the ground.

11. A method of controlling at least one lift cylinder that pivotably connects a feeder of an agricultural harvester to a chassis of the agricultural harvester, the method comprising:

receiving a signal representing a detected ground surface composition in an area behind a pickup mechanism of a header, the header including a frame that supports the pickup mechanism, and the pickup mechanism including at least one wheel that supports the frame on the ground; and operating the at least one lift cylinder in adjusting a pressure that the header exerts on the ground based on the detected ground surface composition;

wherein the at least one wheel that supports the frame on the ground comprises a pair of front wheels supporting a forward portion of the frame; and wherein the pair of front wheels are arranged at a fore of a wind guard assembly and at respective lateral ends of the wind guard assembly of the pickup mechanism.

12. The method of claim 11, wherein the detected ground surface composition comprises an irregular pattern of left-over crop on the ground; and wherein the at least one lift cylinder operates in decreasing the pressure that the header exerts on the ground based on the irregular pattern of left-over crop on the ground.

13. The method of claim 11, wherein the detected ground surface composition comprises an irregularity in the ground, including tire tracks or a border; and wherein the at least one lift cylinder operates in decreasing the pressure that the header exerts on the ground based on the irregularity.

14. The method of claim 11, wherein the at least one wheel that supports the frame on the ground further comprises a pair of rear wheels supporting a rearward portion of the frame on the ground.

15. The method of claim 11, wherein the adjusted pressure that the header exerts on the ground based on the detected ground surface composition includes adjusting the pressure on the at least one wheel of the pickup mechanism.

16. The method of claim 11, wherein the at least one lift cylinder operates in increasing the pressure that the header exerts on the ground based on the detected ground surface composition.

* * * * *